EMORY LAKATOS
INVENTOR.

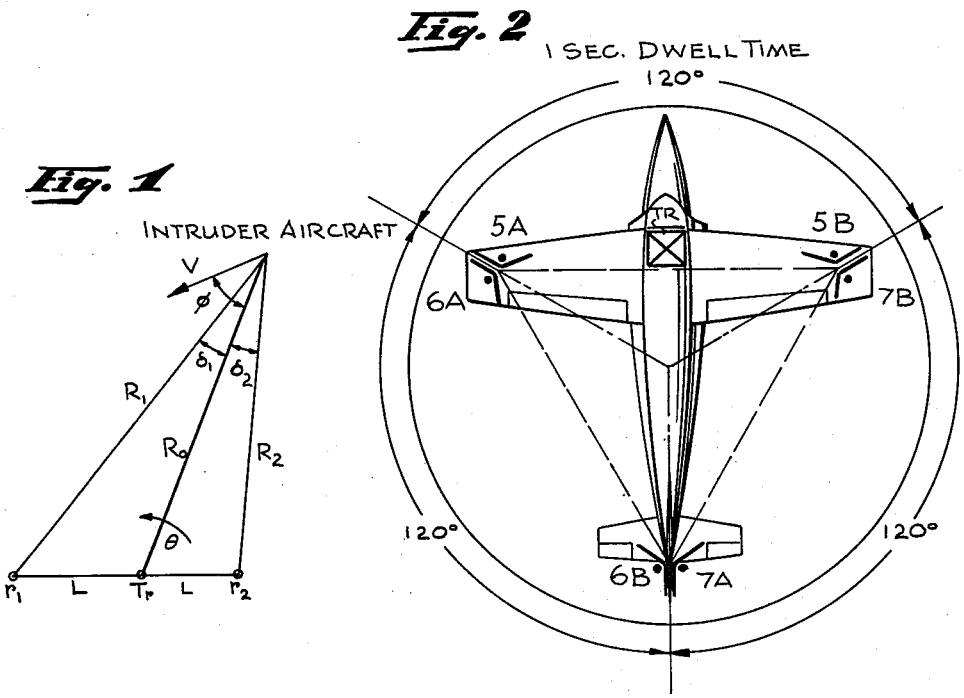
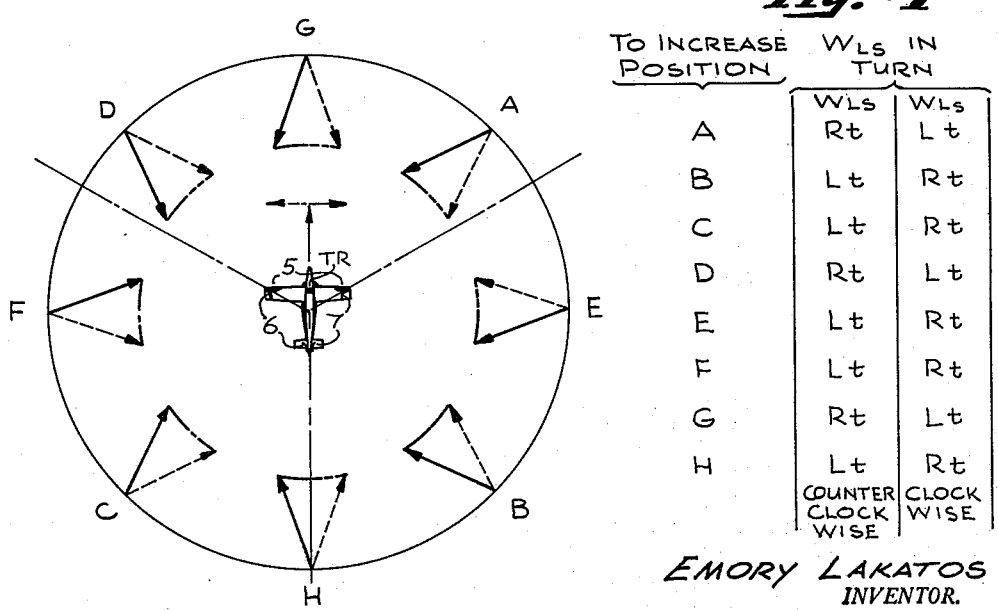

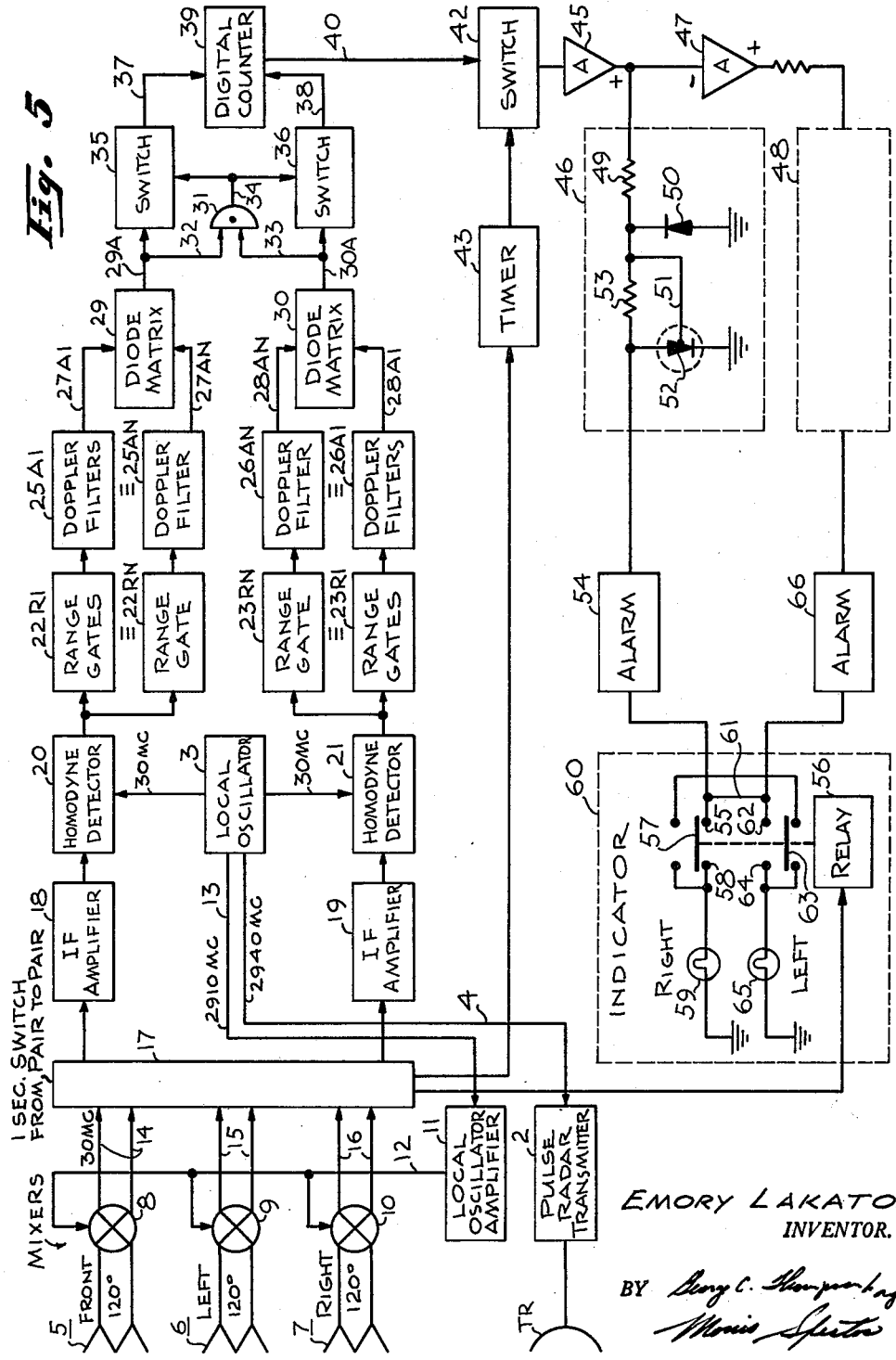

United States Patent Office 3,134,100
Patented May 19, 1964

3,134,100
DOPPLER DIFFERENCE COLLISION
WARNING SYSTEM
Emory Lakatos, Santa Monica, Calif., assignor to Thompson Ramo Wooldridge Inc., Los Angeles, Calif., a corporation of Ohio
Filed July 29, 1959, Ser. No. 830,373
19 Claims. (Cl. 343—5)

This invention relates to a Doppler difference collision warning system and more particularly to a radar collision warning system capable of measuring the angular change in the line of sight between two vehicles.

Many collision warning systems have been proposed each of which is capable of providing results limited by errors such as air gust accelerations. In addition no natural system for determining the direction of evasive maneuver to be taken manifests itself in the known prior systems thus causing the necessity of greater lateral clearance between vehicles at the time of warning. It has also been necessary to provide an unusually long signal processing time to be able to satisfactorily distinguish between an echo and noise.

It is, therefore, an object of this invention to provide a two position reception Doppler radar system capable of providing collision warning relatively unaffected by the acceleration of the colliding vehicle to the system.

It is another object of this invention to provide a Doppler radar system capable of measuring the angular rate of change of the line of sight between the system and a colliding vehicle.

It is still another object of this invention to provide a two receiver Doppler radar system for detecting colliding vehicles capable of providing a comparison of a difference between the Doppler shifts of the two receivers to provide an angular velocity vector of the line of sight from the system transmitter to the intruder vehicle.

Another object of this invention is to provide a two receiver Doppler radar system capable of providing rapid distinction between return echos and interference noise.

It is another object of this invention to provide a system of comparing two received Doppler frequencies for the purpose of determining the line of sight angular velocity to an intruder vehicle and further providing signal threshold below which the magnitude of the signal is considered dangerous.

It is another object of this invention to provide a plurality of receiving antennas utilized in pairs and processed through a single receiver capable of providing a difference signal between the echo signals received by each antenna of each pair.

Other objects, purposes and characteristic features will become obvious as the description of the invention progresses.

In practicing this invention there is provided in one system, a 360° receiver azimuth coverage through the use of a plurality of antennas. The system is provided with a single transmitter capable of periodically transmitting radio frequencies in all directions from the system vehicle. Return echos from any other vehicle in the vicinity of the system vehicle are then received by at least one pair of the plurality of antennas positioned to cover the 360° azimuth. The pair of receiving antennas while receiving return echos remain active for a sufficient period of time to provide for signal processing through the receiver system to indicate the angular rate of change of the line of sight between the two vehicles. The angular rate of change is then compared to a minimum miss distance angular rate of change threshold for the purpose of determining whether the angular rate of change is sufficient to provide a safe miss distance. If the angular rate of change is insufficient the direction of angular change is determined and a proper collision warning indication is given.

FIGURE 1 is a diagrammatic illustration of the angular rotation detection by two spaced apart receiver devices.

FIGURE 2 is a diagrammatic illustration of a typical vehicle antenna installation.

FIGURE 3 is a view of a graphical illustration for the purpose of determining the proper vehicle turn direction for sample intruder vehicle position.

FIGURE 4 is a chart showing the proper turn directions for each of the designated intruder vehicle approaches.

FIGURE 5 is a schematic view of one embodiment of this invention utilizing two receiver processing.

In each of the views similar parts bear like reference characters.

Figure 6:
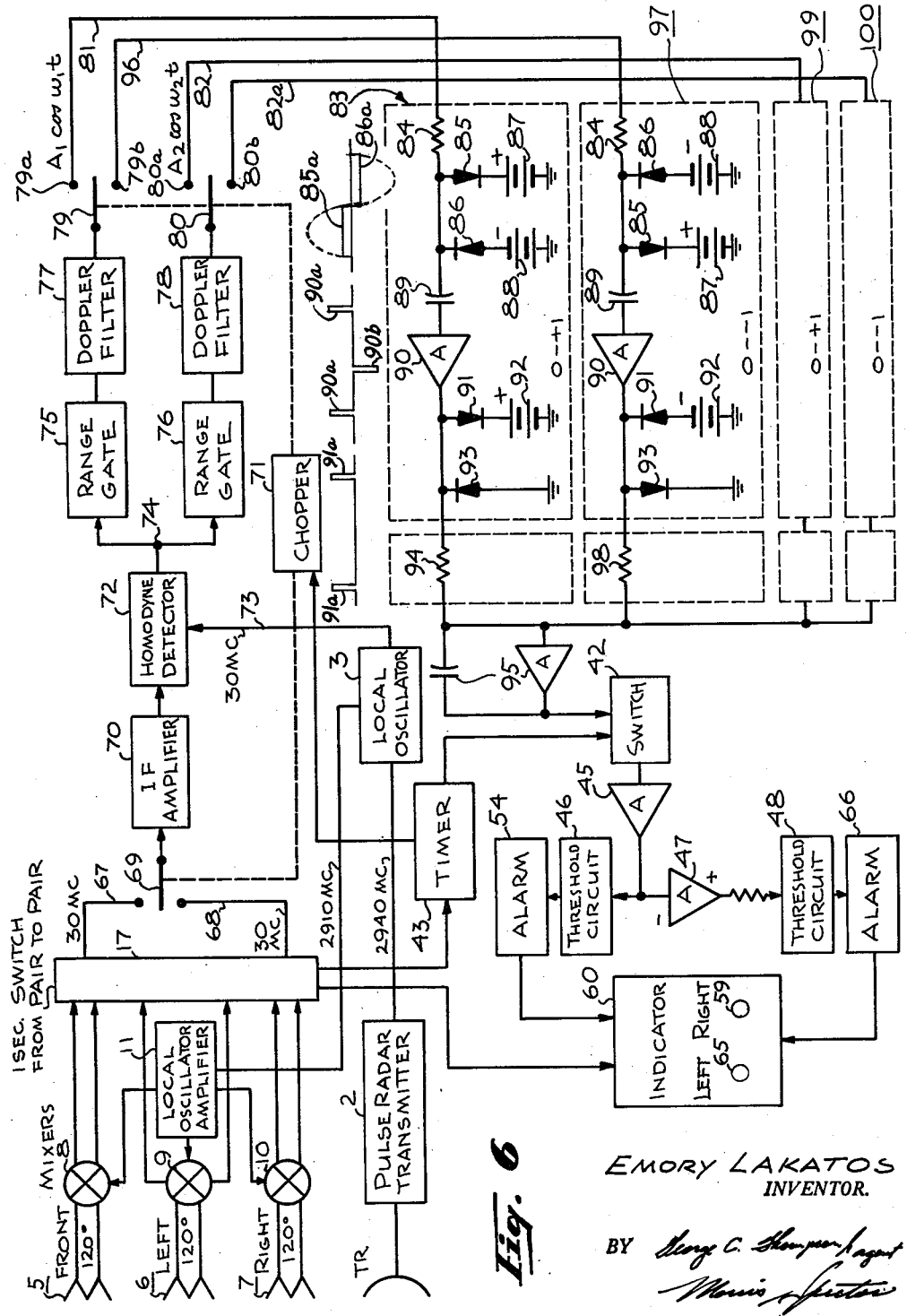
FIGURE 6 is a view of another embodiment of this invention utilizing a single receiver processing circuit.

FIGURE 1 is a vectorial representation of the present system. Since the relationship between the system carrying vehicle and the intruder vehicle is one involving relative motion of the two vehicles, it is a more simple concept to assume that the system vehicle is stationary and the intruder vehicle is moving. With this assumption and with the system vehicle having two receivers and/or antennas indicated as $r_1$ and $r_2$ positioned at locations as far apart as possible, a vector relationship (shown in FIGURE 1) results. The objective is to measure the difference between Doppler shifts at the two receivers resulting from return echos of a transmitted signal that is reflected from the intruder vehicle. This Doppler difference is proportional to the angular velocity vector $W_{LS}$ of the line of sight from the transmitter to the intruder vehicle. If we assume that the transmitter is located at $T_r$ and with the receivers $r_1$ and $r_2$ with vector $V$ being the relative velocity of the intruder vehicle, the Doppler shifts $f_{d1}$ and $f_{d2}$ at the receivers $r_1$ and $r_2$ can be shown as:

$$f_{d1} = -\frac{V}{\lambda}[\cos\phi + \cos(\phi - \delta_1)]$$

$$f_{d2} = -\frac{V}{\lambda}[\cos\phi + \cos(\phi + \delta_2)]$$

where:
$\phi$ is the angle between vector $V$ and the path $R_0$ of the transmitter signal,
$\delta_1$ is the angle between the path $R_0$ and the receiver $r_1$ to intruder vehicle path $R_1$,
$\delta_2$ is the angle between the path $R_0$ and the receiver $r_2$ to intruder vehicle path $R_2$, and
$\lambda$ is the wavelength of the transmitted radiation.

The Doppler frequency difference $\Delta f_d$ is:

$$\Delta f_d = f_{d1} - f_{d2} = -\frac{V}{\lambda}[\cos(\phi - \delta_1) - \cos(\phi + \delta_2)]$$

$$= \frac{2V}{\lambda}\sin\left(\phi + \frac{\delta_2 - \delta_1}{2}\right)\sin\frac{\delta_1 + \delta_2}{2}$$

If $R_0 \gg 2L$, then $$\sin(\delta_1 + \delta_2) = \delta_1 + \delta_2 \cong \frac{2L}{R_0}\sin\theta$$

or $$\Delta f_d \cong \frac{2V}{\lambda}\sin\phi \times \left[\frac{L\sin\theta}{R_0}\right]$$

$$= \frac{2}{\lambda}W_{LS}L\sin\theta$$

where $2L$ is the separation between receivers $r_1$ and $r_2$ and $\theta$ is the angle between the path $R_0$ and the line extending from $r_1$ to $r_2$, and $W_{LS}$ is the rate of rotation of the line $R_0$.

The angle $\theta$ can be determined through the use and expense of a considerable increase in equipment. However satisfactory results can be realized by assuming that the angle $\theta$ falls between 30° and 90° taken from a position transverse to the antenna group axis. In this way the value of sin $\theta$ can vary only between 0.5 and 1.0 with the result that any error introduced is within acceptable tolerances and on the side of safety if 0.5 is used. A value of 0.5 or 30° angle is the most undesirable angle that can possibly be encountered.

In order to cover a complete 360° span about a system carrying vehicle, it has been found desirable to utilize three pairs of sensing means or antennas 5A, 5B, 6A, 6B and 7A, 7B with each pair covering a different 120° of the 360° azimuth (see FIGURE 2). This system is based upon the principle of utilizing a single transmitter antenna TR transmitting in all directions and a pair of receivers, or equipment, each capable of receiving the return echo through antennas at spaced apart locations on the vehicle. By placing the receiving antennas at spaced apart locations, it is possible to obtain a difference in Doppler shifts from the two receivers with the difference signal being proportional to the angular velocity vector of the line of sight from the transmitter to the intruder vehicle. Since it is necessary to use a plurality of antennas or rotating antennas to cover a 360° azimuth and since it has been found that the signal processing time within the receivers can be drastically reduced because of the comparison of the two receiver signals, inherently causing a reduction in noise interference, the desirable antenna arrangement is to provide three pairs of antennas with receivers sequentially connected to each pair for a period of time such as a one second dwell time.

Utilizing an antenna arrangement such as shown in FIGURE 2 with a one second dwell time on each pair of antennas it is next necessary to determine the proper direction of system vehicle evasive maneuver to provide an increase in angular line of sight rotation $W_{LS}$. Development of the proper turn direction, results in a determination of, in general, a right hand turn for a counterclockwise line of sight rotation when the intruder vehicle is in the front 120° quadrant, and for the remaining two quadrants facing generally to the rear of the vehicle a left hand turn is proper for the counterclockwise rotation of the line of sight. For a line of sight rotation in the clockwise direction the reverse direction of turn is needed in each of the quadrants. The direction of rotation of sample intruder vehicle approaches is illustrated in FIGURE 3 and listed in FIGURE 4.

The illustration of FIGURE 3 represents the proper turn direction for both clockwise and counterclockwise line of sight rotation for typical intruder vehicle approaches A through G toward the system vehicle. In this view a rotation direction caused by the representative intruder vehicle vector lines that are dotted dictates a turn in the direction of the dotted vector in front of the system vehicle. Similarly intruder vehicle line of sight rotation represented by the solid vectors dictate system vehicle turn in the direction of the front positioned solid vector.

The chart of FIGURE 4 indicates the proper turn direction for a system vehicle in response to the approach of an intruder aircraft from points A through G of FIGURE 3. A turn in the specified direction will cause an increase in $W_{LS}$ for an increase in miss distance of the two vehicles.

The only consideration not recited, and shown in FIGURES 1, 2 and 3 is the approach of an intruder vehicle in which the line of sight provides a zero angular rotation component. Under these conditions, a turn in either direction regardless of the quadrant would provide adequate miss distance since any deviation from the original course of the system vehicle would result in the arrival of the system vehicle at the projected point of collision at a time later than the original projected point of collision. In addition, the path of the system vehicle is also changed resulting in at least a displacement of the projected point of collision to a new location. These two factors would then result in an angular rotation of the line of sight between the two vehicles.

Each pair of antennas shown in FIGURE 2 is provided with shielding or reflectors capable of limiting the reception of each pair to basically 120° of the 360° azimuth. With this type of shielding a small zone relatively close to the vehicle and of very narrow width along the borders of each of the 120° quadrants is not completely covered. However, this zone along each of the borders is of extremely narrow width and of such limited range that it is not believed possible for a vehicle to be totally within this zone to the extent of not being detected.

In the embodiment of FIGURE 5, there is shown a transmitting antenna TR supplied by a pulse radar signal, by a radar transmitter 2 provided with an oscillator input signal from the oscillator 3 over the input signal circuit 4. The transmitter antenna TR is omni-directional in order to cover the 360° azimuth. With the signal being transmitted from the antenna TR and striking an intruder vehicle a return signal will be received by one pair of the three pairs of receiver antennas 5, 6 and 7. Each of the pairs of antennas 5, 6 and 7 feed their return echo signals into the mixers 8, 9 and 10 respectively. The mixers 8, 9 and 10 are supplied with a mixing signal from the local oscillator amplifier 11 over the channel 12 which differs from the transmitted signal by the IF frequency. The local oscillator amplifier 11 receives its input signal from the oscillator 3 over the channel or path 13. It can be seen, therefore, that the return echo signals are mixed with a signal that originates from the oscillator 3 which also supplies the transmitter with its oscillating frequency. This arrangement eliminates any errors that may occur in the Doppler frequency shift due to improper transmitter and receiver coordination. The mixers reduce the incoming frequencies of the incoming pulses from the antenna pairs 5, 6 and 7 to a sufficiently low frequency, centered about for example, 30 mc., so that receiver processing can be accomplished without excessive losses. The pulses whose common frequency is now 30 mc. plus or minus the Doppler frequency is then supplied over the channels 14, 15 and 16 for each of the pairs of antennas 5, 6 and 7, respectively (depending upon the active pair at this moment) to the antenna switching circuit 17 utilized for sequencing the pairs of antennas in their connection with the receiver. The antenna switching circuit 17, for example, may cause the front antenna pair 5 to be connected to the two IF amplifiers 18 and 19 with one front antenna 5A, connected directly to the IF amplifier 18 and the other front antenna 5B being connected directly to the IF amplifier 19. It is, therefore, obvious that any signal being received by the two front antennas will be separately fed into the IF amplifiers 18 and 19 of the two receivers. After a one second dwell period during which time the signal is processed through the two receivers, as will be explained hereinafter, the antenna switching circuit 17 shifts the connections into the IF amplifiers 18 and 19 to another pair such as the left pair of receiver antennas 6 for another one second dwell period. After the one second dwell period has expired, the switching circuit 17 again shifts the IF amplifier connections to the next or right pair of antennas 7 for another one second dwell period. At the expiration of the final one second dwell period the complete 360° azimuth coverage has been obtained. This means that complete coverage has been obtained in, for example, approximately three seconds. Other time periods may be used as desired. It is pointed out, however, that satisfactory results can be obtained with continued sequential antenna switching for complete 360° coverage during each three seconds. Any return echo from any one of the pairs of antennas is then processed through the IF amplifiers 18 and 19 and mixed in the homodyne or zero beat detectors 20 and 21 respectively with the frequency of the local oscillator 3 and fed into the range gates 22R1 through 22RN and 23R1 through 23RN, respectively. The output of each of the detectors (20) and (21) is still a sequence of pulses whose amplitudes are proportional to cos W$dt$.

Greater receiver detail may be obtained from the copending application Serial No. 587,768, filed May 28, 1956, issued July 4, 1961, as Patent No. 2,991,463, entitled "Collision Indication System," invented by M. F. Gordon et al. and assigned to the common assignee. It is felt sufficient at this time to state that a plurality of range gates are provided for the purpose of reducing noise in the received signal.

The outputs of the range gates 22R1 through 22RN and 23R1 through 23RN are then fed into suitable associated Doppler filters 25A1 through 25AN and 26A1 through 26AN, respectively. This results in a sinusoidal signal occurring on one of a plurality of output circuits 27A1 through 27AN and one of a plurality of output circuits 28A1 through 28AN depending upon the active range gate of each of the receivers.

As pointed out in the previously referred to application, Serial No. 587,768, the setting of each of the range gates and the band pass of the associated Doppler filter are interrelated for proper tracking of the intruder vehicle within the span of each range gate.

The output signal from each active output circuit of the groups 27A1 through 27AN and 28A1 through 28AN is then fed into respective diode matrix circuits 29 and 30. The diode matrix circuits are of any suitable well-known type capable of connecting the incoming active Doppler filter lead or circuit of each receiver to the output circuits 29A and 30A.

The output from the diode matrixes appearing on the output circuits 29A and 30A are then applied to a detector gate 31 over the input circuits 32 and 33, respectively. The detector gate 31 may be a suitable "AND" gate necessarily requiring a signal input circuit from both 32 and 33 in order to provide an output pulse over the output circuit 34. It, therefore, can be seen that a signal output from the diode matrix 29 and not from the diode matrix 30 would result in no output over the output circuit 34 and, thus cause the switches 35 and 36 to remain inactive. If, however, there is a signal from both diode matrixes the detector 31 will become active providing an output signal over its output circuit 34 to each of the switches 35 and 36. In response to this output circuit activation, the switches 35 and 36 become active to supply the pulse Doppler frequency from each of the receivers to a pair of circuits 37 and 38 respectively connected to a digital counter 39.

The digital counter 39 acting as a sign discriminator is of any suitable well-known type capable of counting up in response to the frequency output of one receiver and down in response to the frequency output of the other receiver for supplying a resultant output over the output conductor 40 in response to the two input signals. The combined counter 39 output has magnitude and sign value and is available for application to the next stage at any selected time. It is pointed out however that the counter output 39 will change with each return echo. Since the incoming echo signals are being received from the active pair of antennas over a one second period it is necessary to prevent an output from the counter 39 until the receiver signals have been received and summed by the counter 39 for the one second period. This action is provided by a suitable switch 42, which may be in the form of an "AND" gate. The switch 42 is activated by a suitable timer such as the timer 43 which is keyed to the antenna switching mechanism 17 so as to delay the switching of the switch 42 for the one second time period following each antenna shift. If we assume that the switch 42 is activated by timer 43, it can be seen that a signal will be fed to a suitable signal amplifier 45 which is used for the purpose of providing an increase in signal magnitude.

At this point in the processing circuit it is necessary to determine the relative magnitude of the signal as well as its sign. The magnitude of the signal is an indication of the miss distance between the system and the intruder vehicle while the sign of the incoming signal will indicate the direction in which the system carrying vehicle must turn to increase the miss distance. Since we are interested only in intruder vehicles approaching the system vehicle at a dangerous miss distance it is obvious we are interested only in the signal strength below a desired threshold voltage level. If the signal is sufficiently large to be greater than the threshold voltage it is desirable that no signal be given.

If we assume that the incoming signal is positive in sign and first of a magnitude greater than threshold voltage it can be seen that the signal will be fed into the threshold detector 46 and into the sign reversing amplifier 47. The output of the sign reversing amplifier 47 is connected into another threshold detector 48 which is identical to the threshold indicator 46, to be explained hereinafter. The amplifier 47, however, will provide an output to the threshold detector 48 only when the signal input to the amplifier 47 is of negative value.

Since in this example the signal is assumed to be positive it can be seen that no signal output will occur from the amplifier 47.

If we now assume that the signal is fed into the threshold detector 46 only, it can be seen that the signal passes through a limiting resistor 49 and is applied to the anode of a rectifier 50. The rectifier 50 is for the purpose of assuring that the incoming signal is a positive sign since a negative voltage would go to ground through the rectifier 50. Since we have assumed that the incoming signal voltage is greater than the threshold established level it can be seen that the voltage will be applied to the control element 51 of a suitable controlled semi-conductor 52. With the signal voltage above the design of the threshold voltage of the control element 51, the semi-conductor 52 becomes conductive and grounds the signal preventing an output to the alarm circuit. If, however, the incoming signal is a signal indicating a dangerous or small miss distance, the signal is below the threshold voltage needed for the control element 51 of the control rectifier 52. When this occurs the signal is not grounded through the resistor 53 and the control rectifier 52 but is delivered to the alarm circuit 54 providing an alarm signal and to the contact 55 of a suitable indication direction control relay 56.

The relay 56 is controlled by the antenna switching circuit 17 to provide the proper evasive direction signal for the proper quadrant and angle of rotation. If we assume that the positive signal results from a counter clockwise line of sight angular rotation and if we further assume that the signal is being received by the front pair of antennas 5 then the relay 56 would necessarily be de-energized to cause the contact member 57 to supply a signal to the contact point 58 connected to the suitable right turn light 59 of the indicator 60.

If the positive signal had been received by either the left or right quadrant antennas 6 or 7 the relay 56 would have been energized causing the signal from the threshold detector 46 and alarm 54 to be supplied over the conductor 61 to the contact point 62. With the relay energized, the movable contact 63 connects the contact point 62 to the contact point 64 to supply energy to the left turn light 65, therefore, indicating a left turn in these two quadrants.

If the angle of rotation has been clockwise the signal supplied by the amplifier 45 would have been negative resulting in an output signal from the threshold detector 48 and operation of the alarm 66 along with the proper indicator light 59 or 65 depending upon the quadrant from which the signal is received.

The embodiment of FIGURE 6 provides basically a similar type of warning system to that shown in FIGURE 5 except that in this system the output of the antenna switching circuit 17 feeds out through the circuits 67 and 68 to a chopped or multivibrator contact 69 to feed into a single IF amplifier 70. For example, if we consider the front pair of antennas 5 as being connected through the mixer 8 to the antenna switching circuit 17 it can be seen that one of the pair of antennas 5 will present its return echo signal to the conductor 67 while the other of the pair of antennas 5 will present its return echo signals to the conductor 68. Since the antenna switching circuit maintains these antennas connected for a one second period, it is necessary for the chopper contact 69 of a suitable chopper or multivibrator 71 to connect the conductor 67 to the IF amplifier 70 for one-half of that time period and the conductor 68 to the IF amplifier 70 during the remaining half of the time period. If we assume that the contact 69 of the chopper 71 is in contact with the conductor 67, it can be seen that one of the antennas 5 will be connected to the IF amplifier 70. With this antenna connected to the IF amplifier 70, and with IF amplifier being connected to a homodyne detector 72 which is supplied by a signal from the local oscillator 3 over the circuit 73, the detected signal is applied to the output circuit of the Doppler detector which in turn connects to a plurality of range gates 75 and 76. Although there is shown only two range gates, it is to be understood that the plurality of range gates would probably include several more such gates which would however be duplicates of those already shown.

One of the plurality of range gates will become active in response to the incoming signal depending upon the distance of the intruder vehicle from the system vehicle.

The range gates 75 and 76 are connected through suitable Doppler filters 77 and 78, respectively, to chopper contacts 79 and 80 respectively actuated by the chopper 71. When the chopper contact 69 is in contact with the conductor 67, the chopper contacts 79 and 80 are operated between the fixed contacts 79a and 79b and 80a and 80b, respectively, at some suitable rate, for example 100 cycles per second. If we assume that the incoming signal is of the proper range to activate the range gate 75 it can be seen that the signal will be alternately applied to the fixed contacts 79a and 79b. When the signal (cosine wave) is applied to the fixed contact 79a a circuit 81 carries the signal to a limiter differentiator and clipper circuit 83. The cosine signal on the circuit 81 is first fed through a heavy bipolar clipper circuit including a series isolating resistor 84 and back-biased diodes 85 and 86 biased by the batteries 87 and 88, respectively. This clipping circuit, being a heavy clipping circuit, provides positive and negative clipped lobes 85a and 86a of relatively small amplitude compared to the incoming cosine signal, to be passed through the coupling capacitor 89 to the differentiating amplifier 90. The differentiating amplifier 90 produces rate of change pulses 90a and 90b, the positive pulses of which are limited by the diode 91 and bias battery 92, and the negative pulses of which are by-passed to ground.

It can be seen that the pulses are applied to the summation resistor 94 to be added and integrated by the integrating amplifier 95 capable of receiving pulses from all of the signal processing channels.

During the time that the contact 69 is in contact with the conductor 67 the chopper 71 shifts its contact 79 between opposite positions. The contact 79, after connection with the circuit 81, makes contact then with the fixed contact 79b and circuit 96 which provides an input to a limiter differentiator and clipper circuit 97 similar to the circuit 83 described hereinbefore except that the positive pulses are by-passed to ground and the negative pulses are limited due to the diode reversals. The output from the circuit 97 is fed through an adding resistor 98 and applied to the integrator 95 as described in connection with the circuit 83. The signal is stored at the integrator 95 until the switch 42 is energized in response to the timer 43 by the antenna switching circuit 17. The net sum of the integrator 95 thus represents the difference in frequency between the two channels.

It is pointed out, however, that the chopper contact 69 is maintained in contact with the conductor 67 for one-half of the receiving period utilized for one pair of antennas. At the end of this half of the receiving period the chopper 71 moves the contact 69 to its other position to cooperate with the conductor 68. The conductor 68 receives its signal from the other of the pair of antennas and this signal is then processed through the receiver and applied through the proper range gate to the processing channels 83 and 97 alternately, if the range gate 75 is active or through the conductors 82 or 82a to the processing channels 99 and 100, alternately, if the range gate 76 is active. At the end of the sensing period for this pair of antennas the timer 43 opens the switch 42 and allows the now integrated signal to be applied to the amplifier 45 and to one of the threshold devices 46 or 48, depending upon the polarity of the integrated signals provided by the integrator 95. As described hereinbefore if the signal is negative the signal will be passed through the signal amplifier 47 before application to the threshold device 48 and if positive it will be passed directly to the threshold device 46 as explained hereinbefore. If the signal is sufficiently small one of the threshold devices (depending upon polarity) will become active and pass the signal. The active threshold device will then cause one of the alarms 54 or 66 to be activated and the indicator 60 to be activated to cause a display of either the left light 65 or right light 59, depending upon the polarity of the incoming signal.

While there has been described what is at present considered a preferred embodiment of the invention, it will be obvious to those skilled in the art that various changes and modifications may be made therein without departing from the invention, and it its aimed in the appended claims to cover all such changes and modifications as fall within the true spirit and scope of the invention.

What is claimed is:

1. A radio Doppler difference vehicle evasive action indicating system comprising, at least a pair of spaced apart sensing means responsive to incoming signals, first means for processing incoming signals from a relatively moving object received by each of said spaced apart sensing means to obtain Doppler frequency shift signals, means for comparing said Doppler frequency shift signals for obtaining a resultant difference signal, and threshold means for providing output signals in response to at least one characteristic of said difference signal.

2. A radio Doppler difference vehicle evasive action indicating system comprising, a pair of spaced apart sensing means responsive to incoming signals over a predetermined azimuth, first means for processing incoming signals from a relatively moving object received by each of said spaced apart sensing means to obtain Doppler frequency shift signals, means for comparing said Doppler frequency shift signals for obtaining a resultant difference signal, and threshold means for providing output signals in response to said difference signal and indicative of the polarity and magnitude of said difference signal.

3. A radio Doppler difference vehicle evasive action indicating system comprising, a pair of spaced apart sensing means responsive to incoming signals over a predetermined azimuth, first means for processing incoming signals from a relatively moving object received by each of said spaced apart sensing means to obtain Doppler frequency shift signals, means for comparing said Doppler frequency shift signals for obtaining a resultant difference signal, threshold means for providing output signals in response to said difference signal and indicative of the polarity and magnitude of said defference signal, and indicators means connected to receive said output signals and responsive thereto for providing an evasive action indication.

4. A radio Doppler difference vehicle evasive action indicating system comprising, at least a pair of spaced apart sensing means responsive to incoming signals over a 360° azimuth, first means for separately processing incoming signals from a single relatively moving object received by each of said spaced apart sensing means to obtain Doppler frequency shift signals, means for combining said Doppler frequency shift signals for obtaining a resultant difference signal, threshold means for providing output signals in response to the polarity and magnitude of said difference signal, and indicator means connected to said threshold means and responsive to said output signals for providing an evasive action indication.

5. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signal, means for combining said Doppler frequency shift signals for obtaining a resultant difference signal, threshold means for providing output signals in response to the polarity and magnitude of said difference signal, and indicator means connected to said threshold means and responsive to said output signals for providing an evasive action indication, said spaced apart sensing means including a plurality of pairs of antennas with each pair covering a segment of the 360° azimuth.

6. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a resultant difference signal, threshold means for providing output signals in response to the polarity and magnitude of said difference signal, and indicator means connected to said threshold means and responsive to said output signals for providing an evasive action indication, said spaced apart sensing means including a plurality of pairs of antennas with each pair covering a segment of the 360° azimuth, said plurality of pairs of antennas having three pairs of antennas positioned to provide a 120° vehicle frontal coverage, a 120° vehicle left rear coverage and a 120° vehicle right rear coverage.

7. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said spaced apart sensing means including a plurality of pairs of antennas with each pair covering a different segment of the 360° azimuth, said plurality of pairs of antennas having three pairs of antennas positioned to provide a 120° vehicle frontal coverage, a 120° vehicle left rear coverage and a 120° vehicle right rear coverage, each antenna of each pair being positioned at the furthermost spaced apart positions available on the vehicle.

8. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said spaced apart sensing means including a plurality of pairs of antennas with each pair covering a different segment of the 360° azimuth, said plurality of pairs of antennas having three pairs of antennas positioned to provide a 120° vehicle frontal coverage, a 120° vehicle left rear coverage and a 120° vehicle right rear coverage, and antenna switching means capable of activating only a single pair of antennas at one time with each pair being active for a sufficient period of time to allow complete signal processing.

9. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said spaced apart sensing means including a plurality of pairs of antennas with each pair covering a different segment of the 360° azimuth, said plurality of pairs of antennas having three pairs of antennas positioned to provide a 120° vehicle frontal coverage, a 120° vehicle left rear coverage and a 120° vehicle right rear coverage, antenna switching means capable of activating only a single pair of antennas at one time with each pair being active for a sufficient period of time to allow complete signal processing, mixer means connected between said active antennas and said antenna switching means for reducing the frequency to be handled by said antenna switching means.

10. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, and transmitter means capable of emitting pulse radio signals in all directions from the carrying vehicle for providing said incoming signals from transmitted pulses returning from relatively moving vehicles.

11. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, transmitter means capable of emitting pulse radio signals in all directions from the system carrying vehicle for providing said incoming signals from transmitted pulses returning from relatively moving vehicles, oscillator supply means connected to said transmitter means and said first means to provide accurate comparison of the transmitted signal and any received signal.

12. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency signals, means for combining said Doppler frequency signals for obtaining a Doppler difference signal, threshold means for providing output signals in response to the polarity and magnitude of the Doppler difference signal, and indicator means connected to said threshold means and responsive to said output signals for providing an evasive action indication, said first means comprising two receiver channels separately connected to respective ones of said spaced apart sensing means.

13. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, second means for combining said Doppler frequency shift signals for obtaining a difference signal, threshold means for providing output signals in response to the polarity and magnitude of said difference signal, indicator means connected to said threshold means and responsive to said output signals for providing an evasive action indication, said first means comprising two receiver channels separately connected to respective ones of the spaced apart sensing means, and detector means responsive only to signals in both receiver channels to provide for activation of said second means.

14. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said first means comprising a single receiver channel alternately applied to each one of the spaced apart sensing means.

15. A radio Doppler difference vehicle evasive action indication system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said first means including a single receiver channel periodically applied to each one of the spaced apart sensing means, said single receiver channel including a plurality of range gates and Doppler filters with bipolar clipping, differentiating and limiting circuits for each range gate and Doppler filter for separately processing positive and negative components of each received Doppler signal.

16. A radio Doppler difference vehicle evasive action indicating system comprising, spaced apart sensing means responsive to incoming signals over a 360° azimuth; first means for separately processing incoming signals from a single relatively moving object received by said spaced apart sensing means to obtain Doppler frequency shift signals; means for combining said Doppler frequency shift signals for obtaining a difference signal; threshold means for providing output signals in response to the polarity and magnitude of said difference signal; and indicator means connected to said threshold means and responsive to said output signals for providing an evasive action indication, said first means including a single receiver channel alternately applied to each one of the spaced apart sensing means, said single receiver channel having a plurality of range gates and Doppler filters with bipolar clipping, differentiating and limiting circuits for each range gate and Doppler filter for separately processing positive and negative components of the signal; said Doppler frequency signal combining means including summation and integrating means for combining the outputs of said bipolar clipping, differentiating and limiting circuits for providing a control signal for said threshold means.

17. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said threshold means including a shunt semi-conductor having a control element for activating the semi-conductor for causing the shunt path to be completed when the signal reaches a maximum threshold level and deactivating said shunt semiconductor when the signal falls below said threshold level thus causing system response to dangerous collision threats.

18. A radio Doppler difference vehicle evasive action indication system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, threshold means for providing output signals in response to the polarity and magnitude of said difference signal, and indicator means connected to said threshold means and responsive to said output signals for providing an evasive action indication, said spaced apart sensing means comprising a plurality of pairs of antennas with each pair covering a different segment of the 360° azimuth, said plurality of pairs of antennas comprising three pairs of antennas positioned to provide a vehicle 120° frontal coverage, a vehicle 120° left rear coverage and a vehicle 120° right rear coverage, and antenna switching means capable of activating only a single pair of antennas at one time with each pair being active for a sufficient period of time to allow complete signal processing, said indicator means being connected to said antenna switching means for providing the proper evasive direction indication.

19. A radio Doppler difference vehicle evasive action indicating system comprising, spaced apart sensing means responsive to incoming signals over a 360° azimuth, first means for separately processing incoming signals from a single relatively moving object received by said spaced apart sensing means to obtain Doppler frequency shift signals, means for combining said Doppler frequency shift signals for obtaining a difference signal, and indicator means for providing evasive action indication in response to the polarity and magnitude of said difference signal, transmitter means capable of providing pulse radio signals in all directions from the systetm carrying vehicle, oscillator supply means connected to said transmitter means and said first means to provide accurate comparison of the transmitted signal and any received signal, said means for combining said Doppler frequency shift signals comprising a digital counter.

No references cited.